Aug 5, 1941.  J. E. McILHON  2,251,364
SIGNALING DEVICE
Filed Dec. 11, 1939
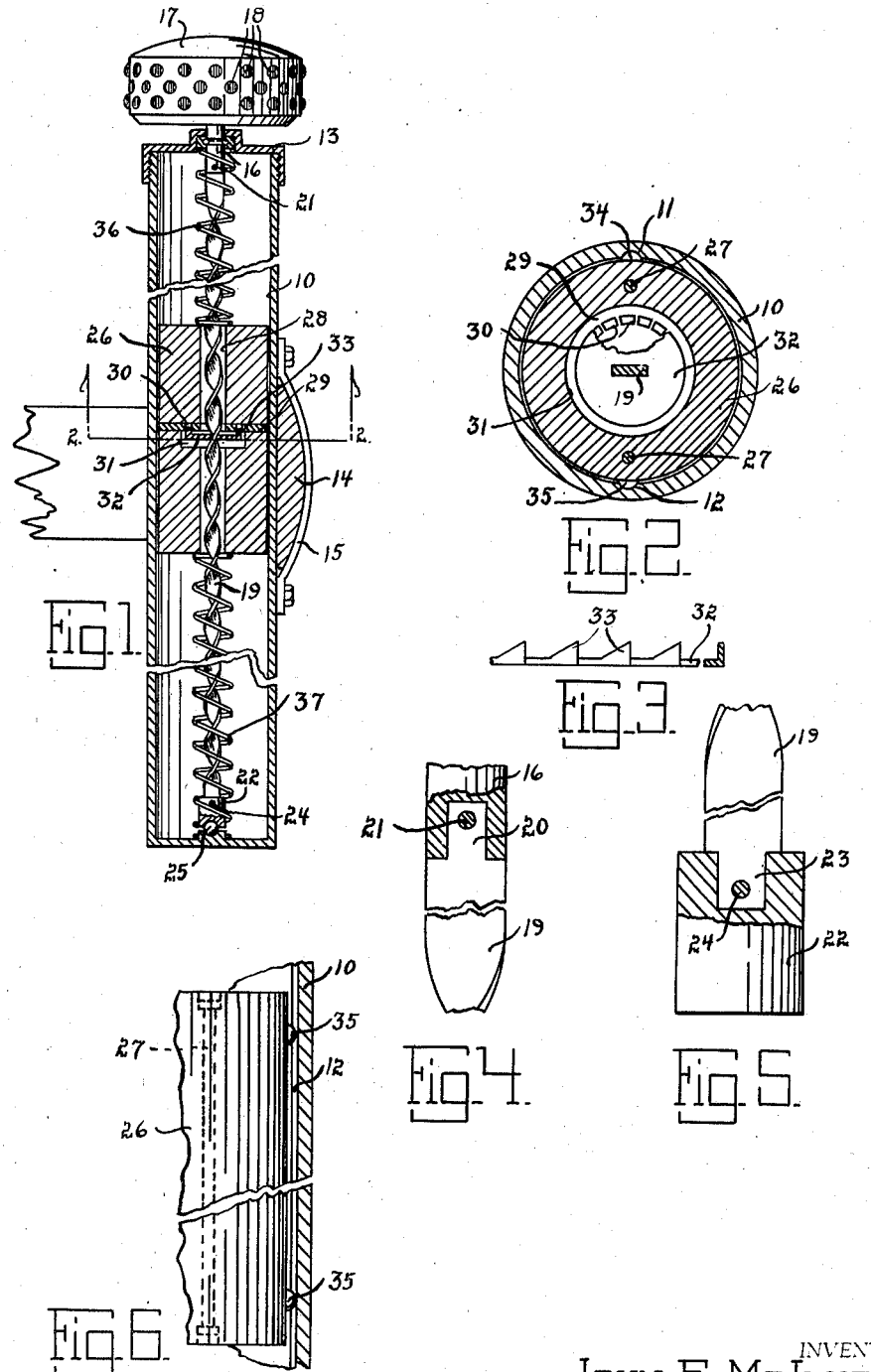
INVENTOR.
JOHN E. McILHON
BY M. Talbert Hick
ATTORNEY.

Patented Aug. 5, 1941

2,251,364

UNITED STATES PATENT OFFICE 2,251,364

SIGNALING DEVICE

John E. McIlhon, Des Moines, Iowa

Application December 11, 1939, Serial No. 308,654

5 Claims. (Cl. 74—127)

The principal object of this invention is to provide a signaling device designed to be secured to a vehicle and which will be actuated by the movement of the vehicle over its road bed.

A further object of my invention is to provide a signaling or advertising device which when set in motion by the action of the vehicle to which it is attached, will be attractive and which will command attention.

A still further object of this invention is to provide a signaling device that is extremely economical in manufacture, durable and efficient in use, and refined in appearance.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side cross sectional view of my signaling device secured to the bumper of a vehicle.

Fig. 2 is an enlarged bottom cross sectional view of a portion of my device and is taken on the line 2—2 of Fig. 1.

Fig. 3 is an enlarged side elevational view of a portion of the clutch disc used in my device.

Fig. 4 is an enlarged side partial sectional view of the spare shaft element showing the method of attaching the spiral element thereto.

Fig. 5 is an enlarged partial sectional view of the bottom shaft portion showing the method of attaching the spiral element thereto.

Fig. 6 is an enlarged cross sectional view of a portion of the casing and counter weight showing the means for keeping the weight in alignment and for preventing its rotation.

One of the principal hazards of night driving is the lack of reliability of lights and lighting equipment, and when these lights fail to function, a vehicle on the highway without any type of illumination is a dangerous hazard. The ordinary reflector buttons while of some utility do not always reflect the light of oncoming or pursuing vehicles so that the driver of the vehicle can see this type of reflected illumination. Furthermore inasmuch as there is no motion imparted to these reflector buttons, they are sometimes difficult to distinguish. I have overcome such disadvantages by providing a signaling device utilizing reflecting buttons or other types of signaling means and to which motion is imparted for enhancing the attractive qualities of the device.

Referring to the drawing, I have used the numeral 10 to indicate an elongated cylindrical housing having therein the two diagonally opposed guide tracks 11 and 12 respectively. The numeral 13 indicates an end cap secured over the open end of the housing 10 by being threaded thereto or by other suitable means. This housing 10 may be suitably secured to the rear bumper of an automobile or other vehicle in the manner shown in Fig. 1. Such a bumper I have designated by the numeral 14 and the bracket for securing the housing 10 to the bumper 14 I have designated by the numeral 15. The numeral 16 designates a shaft rotatably mounted in the end cap 13 and extending therethrough. On the upper end of this shaft 16 I have mounted a cylindrical element 17 having about its peripheral face a plurality of reflector buttons 18 as shown in the drawing.

The numeral 19 indicates a flat twisted metallic strip having its upper end rigidly secured to the lower end of the shaft 16 through the medium of a tongue 20 which is introduced into a slot in the end of the shaft 16 and held therein by a suitable bolt or like 21. The twisted strip member or spiral track element 19 extends down the longitudinal center of the housing 10 and has secured to its lower end a bearing shaft 22. This shaft is secured to the strip 19 by means of a tongue 23 formed on the lower end of the strip 19 which is received by a socket or groove in the element 22 and held in position therein by a bolt or like 24. The numeral 25 indicates a ball directed bearing imposed between the lower end of the element 22 and a receiving socket formed in the inner base portion of the housing 10 as shown in Fig. 1 of the drawing. The numeral 26 indicates a counter weight composed of two sections and held together by ordinary bolts or like 27. The numeral 28 designates a passageway cut through the longitudinal center of the weight segments 26 for permitting the passage of the elongated twisted strip or worm therethrough. The numeral 29 indicates a plate element imposed between the two segments of the weight 26 and having a plurality of slots 30 arranged on the radius of a circle therein as shown in Fig. 2. The numeral 31 indicates a cup portion formed in the lower of the two said segments and in which is placed a clutch plate 32. The numeral 33 indicates a plurality of teeth extending upwardly along the peripherial edge of the clutch disc or plate 32 and designed to be received by the slots or holes 30 in the plate 29 at times. This clutch plate 32 is slidably mounted on the spiral ribbon 19 and is placed within the chamber or compartment 31 so that when the weight 26 is pulled downwardly by gravity, the teeth 33 will engage the holes 30, thereby forcing the spiral strip 19 to rotate and, through the medium of the shaft 16, will rotate the element 17 as will hereinafter be more fully described.

The numerals 34 and 35 indicate ball elements or bearings formed on the weight 26 diagonally opposite from each other and designed to engage the grooves 11 and 12 respectively for preventing the rotation of the weight 26. I have used the numeral 36 to indicate a compression or balancing spring imposed between the end cap 13 and the upper end of the weight 26 and coiled about the spiral strip 19. Similarly the numeral 37 indicates a compression spring coiled about the strip 19 and imposed between the bottom inside portion of the housing 10 and the lower end of the weight 26 as shown in the drawing. These springs serve as a counter balance in aiding the reciprocating movement of the weight upwardly and downwardly within the housing 10 when impelled by the movement of the vehicle to which my device is attached.

The practical operation of my device is as follows:

The housing 10 is secured to the rearward bumper or like 14 of a vehicle and the device is ready for use. As the vehicle encounters uneven roads or springs up and down, this force will be exerted upon the weight 26, drawing the weight 26 upwardly in the housing 10. As the weight is thrown upwardly, the clutch plate 32 will drop into the chamber 31 and will rotate independently of the weight. However, as the weight drops downwardly, the friction of the plate on the upper strip 19 and the greater rapidity with which the weight drops will cause the teeth 33 to engage in the holes or slots 30. Inasmuch as the weight is prevented from turning by the balls 34 and 35 in the grooves 11 and 12 respectively, the plate will also be prevented to rotate, thereby causing the spiral strip to rotate as the plate 32 and weight 26 are further forced downwardly. Thus it will readily be seen that with the spiral strip rotating, the element 17 will also be rotated, causing the reflector buttons to reflect any surfaces of light and imparting a pronounced movement to these reflecting surfaces. The counter springs 36 and 37 being balanced one against the other, tend to preserve this up and down motion of the weight 26, thus causing the device to operate even on slight oscillations of the vehicle to which the device is attached.

Obviously any type of clutch mechanism that will serve to operate or rotate the member 17 in but one direction can be used and in place of the spiral strip 19, a shaft may be used having grooves cut therein and spirally about the shaft. Obviously any type of reflecting means may be secured to the upper end of the shaft 16 in place of the element 17, such as arms having indicia reflecting or elongated means thereon.

Thus it will be seen that I have provided a signaling device which fulfills all of my objects and one which presents many more obvious advantages. My device is simple in structure and efficient in operation and will operate on the slightest oscillation of a vehicle. My device may be placed at any point on a vehicle and may be used wherever there is enough oscillation for actuating the weight 26 upwardly and downwardly within the housing 10.

Obviously the spiral track 19 may have but a single twist or a half twist so that an indicating device may be turned just a half turn or a full turn and advertising being placed on the various sides of the display device. By this structure, a card or other advertising matter may be substituted for the indicator 17 and advertising matter placed on both sides of the card.

Some changes may be made in the construction and arrangement of my improved signaling means without departing from the real spirit and purpose of my invention, and it is my intention to cover by my claims any modified forms of structure or use of mechanical equivalents which may be reasonably included within their scope.

I claim:

1. In a device of the class described, an elongated housing designed to be secured to a vehicle, a spiral track element rotatably mounted in said housing and capable of at least indirectly engaging an indicating means, a weight element slidably mounted in said housing and loosely embracing said spiral track element, means for preventing the rotation of said weight, a means for operatively securing said weight to said spiral track element for causing said spiral track element to rotate in one direction when said weight is moved in one direction, and counterbalance springs interposed between the ends of said weight and the ends of said housing respectively.

2. In a device of the class described, an elongated housing designed to be secured to a vehicle, a spiral strip rotatably mounted in said housing and capable of indirectly at least engaging an indicating means, a weight slidably mounted in said housing adjacent said spiral strip, a clutch plate operatively embracing said spiral strip, a plate element secured to said weight and capable of engaging said clutch plate when said weight is moved in one direction for causing said spiral strip to rotate when said weight is moved in one direction, a spring interposed between the upper end of said elongated housing and the upper end of said weight, and a spring interposed between the inside bottom end of said elongated housing and the lower end of said weight.

3. In a device of the class described, an elongated housing designed to be secured to a vehicle, a spiral strip rotatably mounted in said housing and capable of at least indirectly engaging an indicating means, a weight slidably mounted in said housing adjacent said spiral strip, a clutch plate operatively embracing said spiral strip, a plate element secured to said weight and capable of engaging said clutch plate when said weight is moved in one direction for causing said spiral strip to rotate when said weight is moved in one direction, and means for yieldingly holding said weight adjacent the central portion of said elongated housing.

4. In a device of the class described, an elongated housing designed to be secured to a vehicle, a spiral strip rotatably mounted in said housing and designed to at least indirectly engage an indicating means, a weight member slidably mounted in said housing adjacent said spiral strip, a guide track in said elongated housing, means secured to said weight for moving in said guide track to prevent rotation of said weight in said housing, a clutch plate operatively embracing said spiral strip, and a plate element secured to said weight and capable of engaging said clutch plate when said weight is moved in one direction for causing said spiral strip to rotate when said weight is moved in one direction.

5. In a device of the class described, an elongated housing designed to be secured to a vehicle, a spiral strip rotatably mounted in said housing and capable of at least indirectly engaging an indicating means, a weight member slidably mounted in said housing adjacent said spiral strip, a guide track in said elongated housing, means secured to said weight for moving in said guide track to prevent rotation of said weight in said housing, a clutch plate operatively embracing said spiral strip, a plate element secured to said weight and capable of engaging said clutch plate when said weight is moved in one direction for causing said spiral strip to rotate when said weight is moved in one direction, and means for yieldingly holding said weight adjacent the central portion of said elongated housing.

JOHN E. McILHON.